Aug. 20, 1929.                J. E. STURGES                1,725,224
                            PRUNE PITTING PROCESS
                            Filed March 21, 1928
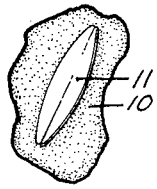
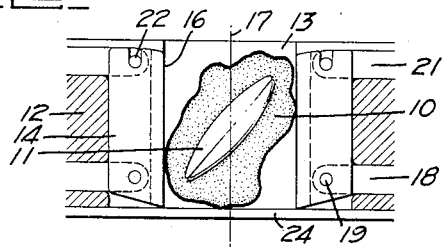
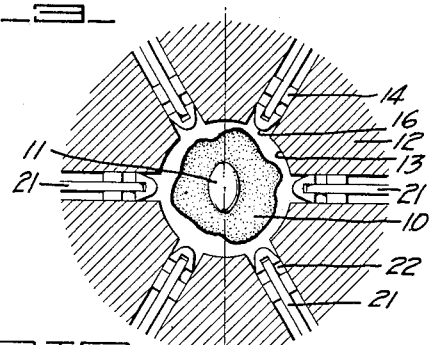
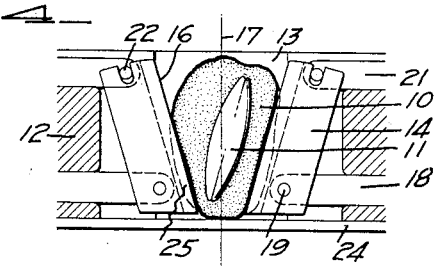
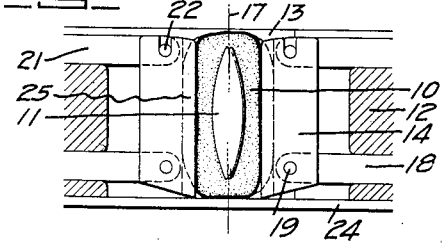
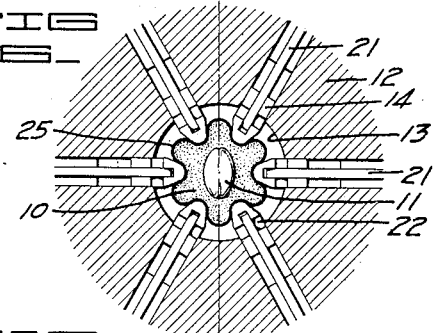
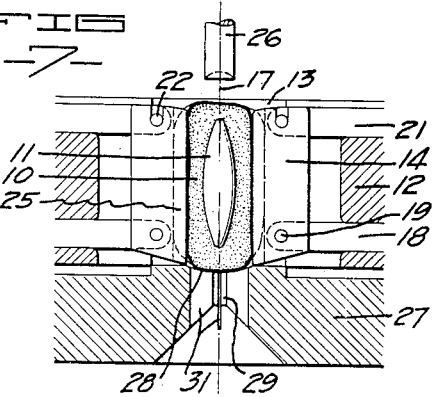
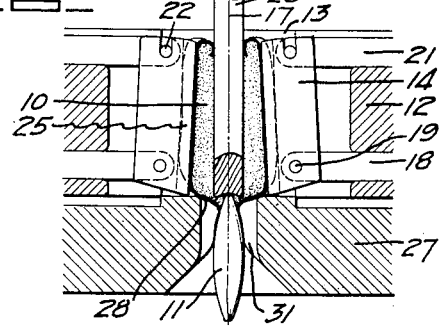
INVENTOR
J. Edwin Sturges
BY
White, Prost & Fryer
ATTORNEYS Patented Aug. 20, 1929.

1,725,224

UNITED STATES PATENT OFFICE.

JOHN EDWIN STURGES, OF BERKELEY, CALIFORNIA, ASSIGNOR TO ROSENBERG BROS. & CO., OF SAN FRANCISCO, CALIFORNIA, A CORPORATION OF CALIFORNIA.

PRUNE-PITTING PROCESS.

Application filed March 21, 1928. Serial No. 263,250.

This invention relates generally to a process of pitting partially dehydrated fruit such as prunes.

It is an object of this invention to devise a process of pitting partially dehydrated fruit which can be performed by a commercially practical form of machine.

It is a further object of my invention to devise a process of effecting aligning of the pit of a partially dehydrated fruit, prior to a pitting operation.

Further objects of the invention will appear from the following description in which I have set forth the preferred embodiment of my invention. It is to be understood that the appended claims are to be accorded a range of equivalents consistent with the state of the prior art.

Referring to the drawing:

Fig. 1 shows a prune such as I propose to pit by my process.

Fig. 2 is a side elevational view in cross section of a simplified form of apparatus capable of carrying out certain steps of the process of this invention, the apparatus being shown in cross section elevation.

Fig. 3 is a plan view of the apparatus shown in Fig. 2.

Fig. 4 is a side elevational view in cross section similar to Fig. 2, but showing the lower end of the prune being squeezed.

Fig. 5 is a view similar to Fig. 2, showing the upper and lower portions of the apparatus contracted so as to squeeze the prune.

Fig. 6 is a plan view of the apparatus in the condition shown in Fig. 5.

Fig. 7 is a side elevational view in cross section showing the apparatus positioned over a stripper and directly beneath a pitting plunger.

Fig. 8 is a view similar to Fig. 7, showing the pitting plunger forcing the pit through the stripper.

In the past it has frequently been attempted to devise a process of pitting prunes adapted for machine operation. These prior attempts have failed principally because the processes did not take into account the non-uniformity of prunes as they are available for such pitting machinery. Generally after drying and processing the prunes, they are stored in large bins or vats after which they are available for a pitting operation. Due to the manner in which they are stored and handled, they are deformed both as to exterior contour, and as to the position of the pit within the prune. Generally the pit is no longer alined with the central axis of the prune, but may be forced towards one side or may be turned at an angle to the general length of the prune. If it is attempted to pit such prunes merely by providing ordinary holding means while a pitting plunger is passed longitudinally thru the prune, the pitting plunger in most instances will not engage the end of the pit, with the result that the pit may be broken or may be forced out side ways through the flesh of the prune, thus badly mutilating the product.

In my invention, I have appreciated the defects in prior processes and have made provision for aligning the pit of the prune before a pitting operation. As will be presently explained, this aligning operation is effected by pressing a plurality of spaced grooves in the sides of the prune, whereby the pit of the prune is forced in a position in substantial alinement with a predetermined axis.

Referring to the drawing for a detailed description of my process, I have shown in Fig. 1 a representative partially dehydrated fruit 10, such as an ordinary prune. The pit 11 of the prune as will generally be the case, is not alined with the general axis of the prune, due to causes explained above.

In Figs. 2 and 3 I represent diagrammatically a form of apparatus which may either be incorporated in a pitting machine, or which may be operated manually to effect the process of this invention. This apparatus is somewhat similar to the basket incorporated in the machine disclosed in my copending application No. 748,555 filed November 8, 1924. It may be explained briefly as comprising a body member 12 having an aperture 13 to receive the prunes. Movably mounted with respect to the body 12 and circumferentially spaced about the aperture 13 are a plurality of members 14, preferably in the form of bars. These bars preferably have their inner edges 16 rounded so as not to break the skin or flesh of the prune. In order to effect radial movement of the same toward the central axis 17 of the basket, I preferably pivotally secure the lower ends of the same to a plurality of radially movable members 18, as by means of pivot pins 19, the members 18 being slidably disposed with respect to the body 12. The upper ends of the bars 14 are capable of radial movement by means of corresponding members 21, having pin and slot connection 22 with bars 14 and likewise slidably disposed with respect to body 12. It is obvious that by simultaneously moving the members 21 inwardly toward the axis 17, the upper end of bars 14 are forced inwardly toward the central axis 17, and correspondingly by moving the members 18 inwardly, the lower portions of bars 14 are moved inwardly toward the axis 17. This device may be likened to a basket in which the upper and lower portions thereof are capable of being contracted independently.

In utilizing the above apparatus in carrying out my process, the prune 10 is dropped within the recess 13 so as to be positioned within the space surrounded by bars 14. It is obvious that in practice the prune must be held within the device, as by means of a lower member 24 which closely underlies the lower ends of bars 14, as shown in Fig. 2. Unless the prune is carefully placed within the recess 13, it will generally be disaligned with respect to the central axis 17, as shown in Fig. 2. As an initial step to my process, I preferably cause the prune to be generally alined with respect to axis 17, by first actuating members 18 so as to force the lower end of bars 14 inwardly an equal amount toward the axis 17, somewhat as shown in Fig. 4. The lower portion of bars 14 at this time may press into the flesh of the prune a certain amount, although not sufficiently to affect the alinement of the pit as will be presently described. As explained above, the main object in first contracting the lower portion of the basket is to bring the prune in general alinement with respect to the central axis 17.

The next step of my process is to contact the upper portion of the basket by actuating members 21, so that bars 14 are positioned somewhat as shown in Fig. 5. When the bars are placed in this position, they are caused to actually press grooves into the flesh of the prune, although the skin of the prune is not damaged because of the rounded edges 16. These pressed in grooves are circumferentially spaced and substantially parallel to each other with respect to the axis 17. The practical effect obtained by pressing these grooves into the prune flesh is to secure a repositioning of the prune pit 11, so that this pit is now forced to take a position in substantial alinement with respect to axis 17 as shown in Fig. 5. As shown in Fig. 6, the circumferential spacing of these grooves, caused by the circumferential spacing of bars 14, permits the prune flesh between the bars to bulge out as indicated at 25 thus obviating bursting of the prune skin due to internal pressure.

The prune is now in position for a pitting operation, which may be effected in any well known manner. For example in Fig. 7 I have shown the device positioned with its axis 17 in alinement with a pitting plunger 26 and above a suitable stripper 27. Strippers suitable for use with my process are well known in the art, although the particular one shown is made of some resilient material such as rubber. The inner face of this stripper which contacts with the lower end of the prune, is preferably concave as indicated at 28, in order to guide the lower end of the pit. The central portion of this stripper is provided with a suitable aperture 29 for passing the pit. A plurality of radial slots 31 may extend from the central aperture 29, in order to more effectively guide a slightly disalined pit toward the central aperture 29.

In Fig. 8 I have shown the pitting plunger 26 being forced thru the prune to eject the pit. If the bars 25 should remain in the position shown in Fig. 7 during a pitting operation, considerable internal pressure will be applied to the flesh of the prune due to the space occupied by the pit during ejection of the same and by the pitting plunger. To prevent such pressure from bursting the skin of the lower portion of the prune and thus causing mutilation of the same, I prefer to slightly enlarge the lower portion of the basket as the pitting plunger 26 passes downwardly thru the prune. Therefore in Fig. 8 I have shown the lower portions of bars 25 slightly shifted outwardly equal increments away from the central axis 17. For example this operation is performed by slightly retracting member 16 equal increments while plunger 26 is passing downwardly thru the prune. Such retracting movement of bars 25 permits space for the expansion of the lower portion of the prune thus preventing mutilation of the same by internal pressure. Immediately after this operation, the plunger 26 may be removed and the prune removed from the basket by opening both the upper and lower portions of the basket, thru movement of members 18 and 21.

It is obvious that the above process is a material improvement over processes which have previously been utilized for pitting prunes. Because of the manner in which the pit is alined with respect to a certain axis, the process may be incorporated in a machine which will operate without manual attention. Furthermore the pitted product will be in relatively good condition without serious mutilation of the flesh of the prune, and will be of comparatively uniform shape due to the reforming effect of the process. When the prune is removed from the basket the pressed in grooves remain to a certain extent but do not injure the final product.

It is obvious that before the prunes are subjected to my process, the flesh thereof must be comparatively plastic. Therefore I prefer before pitting the prunes, to soak the same for a certain length of time in water, to effect a softening of the flesh and skin. After pitting, the prunes may again be dehydrated or treated in any preferred manner to preserve the same for marketing.

While as one step of my preferred process the prune is first generally centered or alined by contracting the lower portion of the basket, it is obvious that the process in its broadest sense may be carried out without the initial centering operation.

I claim:

1. A process of definitely positioning an elongated pit of a partially dehydrated fruit preparatory to a pitting operation comprising pressing a plurality of spaced grooves into the skin and flesh of the sides of the fruit about the pit.

2. A process of definitely positioning an elongated pit of a partially dehydrated fruit preparatory to a pitting operation comprising pressing a plurality of circumferentially spaced grooves into the skin and flesh of the sides of the fruit about the pit, without rupturing the skin of the fruit.

3. A process of definitely positioning an elongated pit of a partially dehydrated fruit preparatory to a pitting operation comprising pressing a plurality of circumferentially spaced parallel grooves into the skin and flesh of the sides of the fruit about the pit, without rupturing the skin of the fruit.

4. A process of definitely positioning an elongated pit of a partially dehydrated fruit preparatory to a pitting operation comprising generally alining the fruit with respect to a given axis and then effecting alinement of the pit with respect to said axis.

5. A process of definitely positioning an elongated pit of a partially dehydrated fruit preparatory to a pitting operation comprising generally alining the fruit with respect to a given axis and squeezing the flesh of the fruit to a degree sufficient to effect alinement of the pit with said axis.

6. A process of pitting a partially dehydrated fruit by means of a pitting plunger, comprising squeezing the sides of the fruit to effect alinement of the pit, forcing the pitting plunger thru the fruit, and relieving the pressure upon the lower portion of the fruit as the pitting plunger passes downwardly thru the same.

In testimony whereof, I have hereunto set my hand.

J. EDWIN STURGES.